No. 877,642. PATENTED JAN. 28, 1908.
A. A. GULDENARM.
CHEESE CUTTER.
APPLICATION FILED JAN. 29, 1906.
2 SHEETS—SHEET 1.
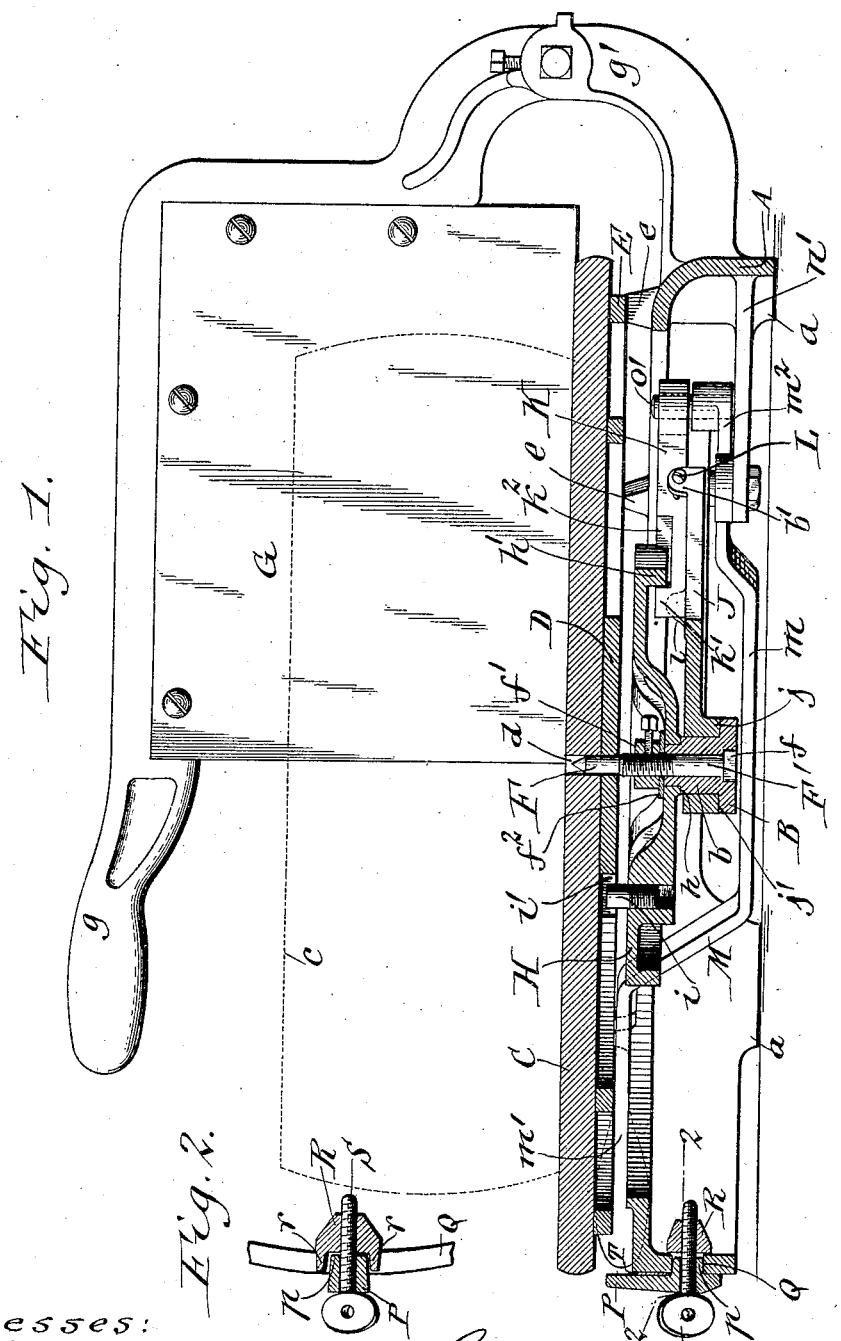
Witnesses:
Louis W. Gratz.
Ruth Tarbell.
Adam A. Guldenarm, Inventor
by Geyer & Popp
Attorneys.

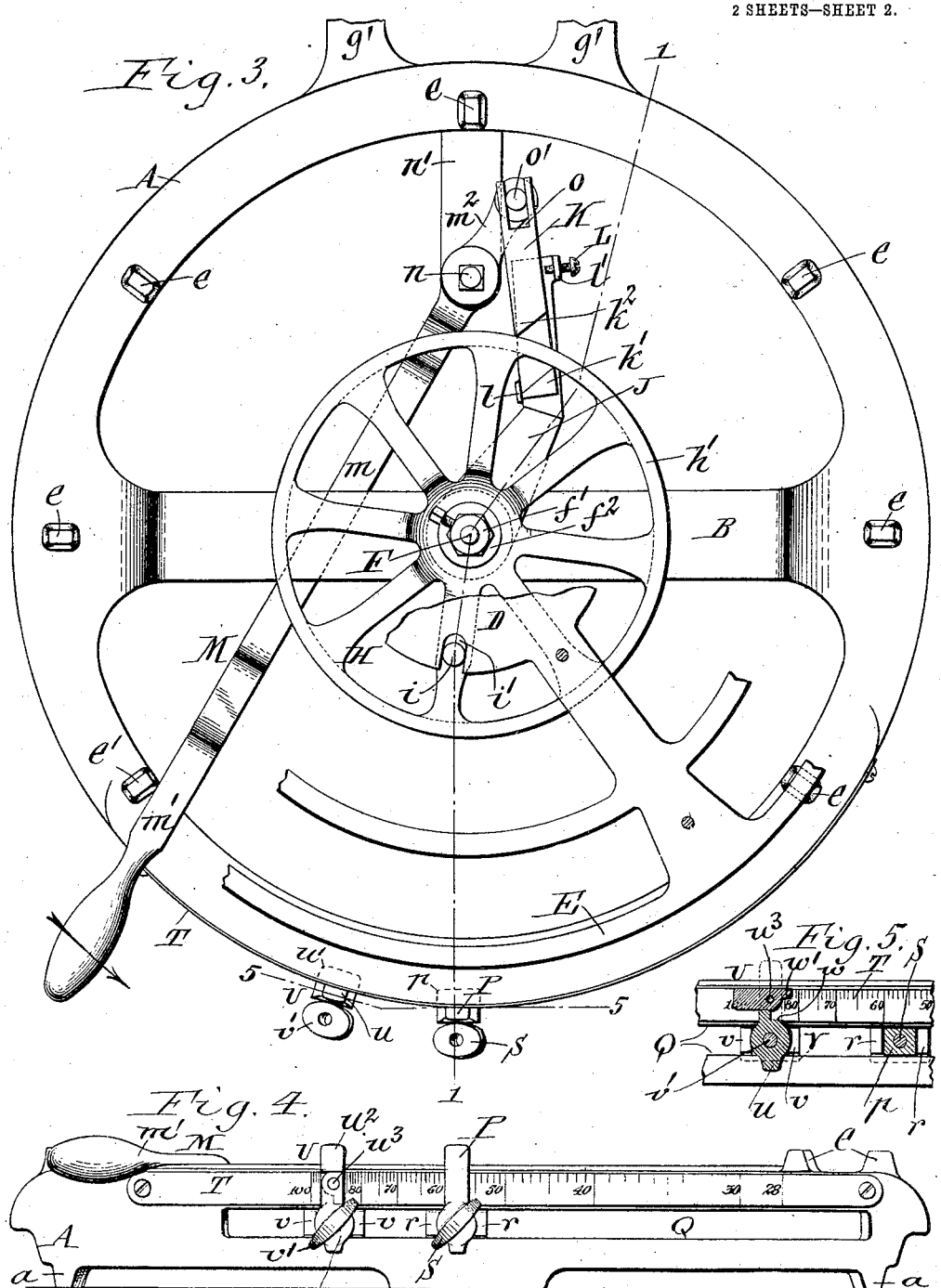

UNITED STATES PATENT OFFICE.

ADAM A. GULDENARM, OF BUFFALO, NEW YORK.

CHEESE-CUTTER.

No. 877,642.

Specification of Letters Patent.

Patented Jan. 28, 1908.

Application filed January 29, 1906. Serial No. 298,358.

*To all whom it may concern:*

Be it known that I, ADAM A. GULDENARM, a citizen of the United States, residing at Buffalo, in the county of Erie and State of New York, have invented a new and useful Improvement in Cheese-Cutters, of which the following is a specification.

This invention relates to a cheese cutter of that type whereby a cheese of circular form may be readily divided into slices or pieces of a predetermined weight or into pieces or slices which are to be sold at a predetermined price.

The object of this invention is to produce a cutter of this character which is simple and inexpensive in construction and which can be readily set and operated for obtaining slices of a certain weight or salable at a certain price.

In the accompanying drawings consisting of two sheets:—Figure 1 is a vertical sectional elevation of the cheese cutter taken in line 1—1, Fig. 3. Fig. 2 is a fragmentary horizontal section in line 2—2, Fig. 1. Fig. 3 is a top plan view of the frame and the means for rotating the cheese supporting board. Fig. 4 is a fragmentary front elevation of the frame, stops and operating lever. Fig. 5 is a fragmentary vertical section in line 5—5, Fig. 3.

Similar letters of reference indicate corresponding parts throughout the several views.

The frame of the cheese cutter consists essentially of a horizontal ring A supported by feet $a$ and a cross bar B extending diametrically across the ring.

C represents the horizontally rotatable board or table upon which the cheese $c$, shown by dotted lines in Fig. 1, is supported while being cut into pieces. The cheese board is pivotally supported by means of a grid or plate secured to the underside of the board and having a hub D at its center and a marginal ring E, a vertical centering pin or spindle F being arranged in an opening $d$ in the hub D and the central part of the cheese board, and lugs $e$ rising from the upper edge of the frame ring and slidingly supporting the ring E. The centering pin is formed on the upper end of a bolt $F^1$ which is arranged in a stud or boss $b$ on the central part of the cross bar B and held in place by the head $f$ at its lower end bearing against the underside of the cross bar and a nut $f^1$ arranged on the thread of the bolt and bearing by means of an intervening washer $f$ against the upper side of said boss.

The upper end of the centering pin or spindle is tapered so as to permit of inserting the same more easily into the opening $d$.

G represents the blade or knife whereby the cheese is cut radially into sector shaped pieces. This blade is arranged on a vertically swinging arm or handle $g$ pivoted to brackets $g^1$ on one side of the frame, in any suitable and well known manner. The mechanism for intermittently rotating the cheese board and advancing different parts of the cheese to the blade is constructed as follows:—H represents a horizontally rotating clutch wheel pivoted on the upper part of the boss $b$ between the shoulder $h$ thereon and the washer $f^2$ and provided at its periphery with a depending clutch rim $h^1$. Adjacent to its periphery the clutch wheel is provided with an upwardly projecting coupling pin $i$ which engages with a notch or recess $i^1$ in the edge of the hub D, whereby the cheese board is caused to turn with the clutch wheel. The centering and coupling pins F, $i$ and coöperating central opening $d$ and recess $i^1$ form a detachable connection between the cheese board and clutch wheel which permits of readily removing and replacing the board for cleaning the same more easily. J represents a horizontally movable rock arm arranged below the clutch wheel and pivoted at its inner end or hub $j$, on the lower part of the boss of the cross bar and resting on a shoulder $j^1$ formed by said bar. Upon the outer part of the rock arm is loosely supported a clutch bar or pawl K which extends underneath the adjacent part of the clutch rim and is provided with inner and outer clutch jaws $k^1$, $k^2$ which are arranged on the inner and outer sides of the clutch rim. These jaws are preferably formed by making an oblique recess on the upper side of the clutch bar, whereby the clutch jaws are produced which taper forwardly to a knife edge, the edges of both jaws being arranged at diagonally opposite corners of said recess, as shown in Fig. 3. At its inner end and on the front side the clutch pawl or bar bears loosely against a front abutment $l$ consisting of a lug which rises from the rock arm while its rear side bears loosely near its outer end against a rear abutment L consisting of a horizontal screw which is arranged in a lug $l^1$ rising from the adjacent part of the rock arm. M represents a horizontally oscillating operating or hand lever whereby the clutch is operated for effecting the forward rotation of the cheese board. The lever is pivoted by a vertical screw or bolt $n$ to a lug $n^1$ on the rear part of the ring A and has a central depressed part $m$ which is arranged below the clutch wheel, an elevated front part or handle $m^1$ which projects over the front part of the frame ring, and an elevated rear part $m^2$ which extends underneath the outer end of the clutch pawl or bar. This end of the latter is provided with an outwardly opening, recess or slot $o$ which receives a vertical pin $o^1$ on the rear part of the hand lever, whereby these parts are operatively connected. Upon turning the hand lever forwardly, as indicated by the arrow in Fig. 3, the outer end of the clutch bar will be tilted so that the edges of the jaws grip the clutch rim on opposite sides and radially out of line, thereby coupling the clutch wheel and bar and causing the cheese board to be moved forwardly with the hand lever. During this forward movement of the clutch bar it bears against the front lug $l$ and thereby causes the rock arm to turn in the same direction. Upon moving the hand lever in the reverse direction the first effect is to tilt the clutch bar in the opposite direction until its outer part bears against the screw L whereby the jaws are disengaged from opposite sides of the clutch rim, and the clutch bar is moved backwardly idly to the end of the stroke in this direction while the clutch wheel and cheese board remain at rest. During the first part of the subsequent forward movement of the hand lever the clutch bar is first tilted into such a position that its jaws grip the clutch rim after which the clutch wheel and cheese board again move forward another step with the hand lever, this operation being repeated for each oscillation of the hand lever. Inasmuch as the hand lever is pivoted eccentrically to the pivot of the clutch wheel and rock arm the pin $o^1$ of the hand lever moves lengthwise of the slot $o$ in the clutch pawl or bar while oscillating those parts. By advancing or retracting the abutment screw L the slack between the clutch bar and rock arm may be nicely adjusted to couple the clutch bar and rim without undue lost motion. It will be observed that in this construction of clutch the bar is confined against endwise movement solely by engagement of the jaws against opposite sides of the clutch rim and against lateral movement by the front and rear abutment on the rock arm.

The front arm or handle $m^1$ of the operating lever is comparatively long while the rear arm $m^2$ thereof is short so that a considerable movement of the front arm produces a comparatively small effective movement of the rear arm for turning the cheese board.

The backward stroke of the hand lever is arrested by a fixed back stop $e^1$ which preferably also forms one of the supporting lugs of the cheese table so that this lever always begins its forward stroke at the same place. When it is desired to feed the cheese forward for cutting off a piece of a certain weight the forward movement of the hand operated lever M is arrested by means of a stop P arranged on the front side of the frame ring and projecting upwardly into the path of the hand lever M. This stop is provided on its lower part with a flat sided guide lug $p$ which projects inwardly into a circumferential adjusting slot Q formed on the front part of the frame ring.

R represents a clamping block bearing against the inner side of the frame ring on opposite sides of the slot Q and having two outwardly projecting guide lugs $r$, $r$ which enter the adjusting slot on opposite sides of the front guide lug $p$. The lugs $p$ and $r$ prevent the stop and block from turning on the frame but permit of adjusting the same lengthwise in the slot Q.

S is a clamping screw which connects the stop P and clamping block R and whereby these parts may be drawn firmly against opposite sides of the frame ring for holding the stop in place.

By adjusting the stop P lengthwise of the slot Q the hand lever may be arrested at different points in its forward movement and the cheese may be fed forward varying distances during each stroke of the hand lever as may be required for obtaining slices of a predetermined weight.

For convenience in setting the stop P for dividing a cheese into pieces of a certain thickness and weight a scale T is provided which is secured to the front side of the frame lengthwise above the adjusting slot. Cheese is usually sold by weight in pieces of half a pound or multiples thereof or in pieces or slices which are worth five cents each and the scale T is therefore graduated accordingly. For arresting the hand lever if the desired slice of cheese is to be of a certain predetermined selling price another stop U is provided which is arranged in advance of the stop P. The price stop U and the means for adjusting the same in the slot Q are the same as those of the weight stop P with the exception that the price stop is capable of being folded and rendered inoperative when not required. For this purpose the price stop is composed of a lower section $u$ having a guide lug $u^1$ projecting into the adjusting slot Q, an upper section $u^2$ pivoted by a horizontal pin $u^3$ to the lower section so that the same can be turned upwardly into the path of the hand lever M or folded downwardly out of the path of said lever, a clamping block V engaging with the rear side of the frame ring on opposite sides of the slot Q and having guide lugs $v$, $v$ which project outwardly into the slot Q on opposite sides of the lug $u^1$, and a clamping screw $v^1$ connecting the lower stop section $u$ and clamping block V. The upward or straightening movement of the upper section of the price stop relatively to the companion lower section is preferably limited by coöperating shoulders $w$, $w^1$ formed on these parts adjacent to the pivotal connection between the same, as shown in Figs. 4 and 5.

Assuming that it is desired to sell a cheese weighing 30 pounds at sixteen cents a pound, netting a total of $4.80, it follows that the cheese must be divided into ninety-six five cent pieces or into sixty half pound pieces in order to realize this sum. Accordingly the price stop U is set at 96 on the scale T and the weight stop P is set at 60 thereon. In this position of the stop U each full stroke of the hand lever M from the back stop $e^1$ to the piece stop U will advance the cheese toward the blade or knife the required extent for cutting off a piece worth five cents. If a piece worth ten-cents is desired the hand lever is moved forward twice and repeated in like manner for multiples thereof. When the customer wishes to buy cheese by weight the upper section $u$ of the piece stop U is turned down out of the path of the hand lever and the latter is then moved forward a full stroke to the weight stop P, thereby advancing the cheese toward the knife to the extent of half a pound. Each additional full forward stroke of the hand lever against the weight stop P advances the cheese in like multiples.

I claim as my invention:—

1. A cheese cutter comprising a frame, a cheeseboard, means for rotating said board having a clutch wheel, and means for coupling said wheel and board consisting of a grid or plate secured to said board and having a notch or recess outside of its pivot and a pin arranged on said wheel and engaging with said notch or recess, substantially as set forth.

2. A cheese cutter comprising a frame, consisting of a ring, a transverse bar extending diametrically across said ring and a boss rising from the center of said bar, a cheese board pivoted on said boss, means for rotating said board having a clutch wheel pivoted on said boss, a grid or plate secured to said board and having a recess on one side of its pivot, and a pin arranged on said clutch wheel and engaging with said recess, substantially as set forth.

3. A cheese cutter comprising a frame, consisting of a ring, a transverse bar extending diametrically across said ring and a boss rising from the center of said bar, a cheese board arranged above the frame, a grid or plate secured to the under side of the board, a bolt secured vertically in said boss and provided at its upper end with a pivot spindle which enters an opening formed centrally in said grid or plate and board, and means for rotating the board having a clutch wheel pivoted on said boss, and a pin arranged on said wheel and entering a recess in said grid, substantially as set forth.

4. A cheese cutter comprising a frame, consisting of a ring, a transverse bar extending diametrically across said ring and a boss rising from the center of said bar, a cheese board arranged above the frame, a grid secured to the underside of the board, a bolt arranged vertically in the boss and provided at its lower end with a head bearing against the underside of said boss, at its upper end with a pivot spindle entering an opening in the center of said grid and board and between its ends with a nut which bears against the upper end of said boss, and means for rotating said board comprising a clutch wheel pivoted on the upper reduced end of said boss between a shoulder thereon and said nut, a pin arranged on said wheel and entering a recess in said grid, a rock arm pivoted on the lower enlarged part of said boss, and a clutch pawl operating to couple and uncouple said rock arm and clutch wheel, substantially as set forth.

5. A cheese cutter comprising a frame, a cheese board pivoted on the frame, and means for rotating the board comprising a clutch wheel operatively connected with said board and having a rim, a rock arm pivoted concentrically with said wheel, a front abutment arranged on the rock arm on the inner side of said rim, a rear abutment arranged on said arm on the outer side of said rim, a clutch pawl supported on said arm between said abutments and having two jaws adapted to engage with opposite sides of said rim, and a hand lever operatively connected with said pawl, substantially as set forth.

6. A cheese cutter comprising a frame, a cheese board pivoted on the frame, and means for rotating the board comprising a clutch wheel operatively connected with said board and having a rim, a rock arm pivoted concentrically with said wheel, an upwardly projecting lug on the front side of said arm within said rim and forming a front abutment, an upwardly projecting lug arranged on the rear side of said arm outside of said rim, a screw arranged in said outer lug and forming a rear abutment, a pawl resting on said arm between said front and rear abutments and having jaws constructed to engage with opposite sides of said rim, and a hand lever operatively connected with said pawl, substantially as set forth.

7. A cheese cutter comprising a frame, a cheese board pivoted on the frame, and means for rotating the board comprising a clutch wheel operatively connected with said board and having a rim, a rock arm pivoted concentrically with said wheel, an upwardly projecting lug on the front side of said arm within said rim and forming a front abutment, an upwardly projecting lug arranged on the rear side of said arm outside of said rim, a screw arranged in said outer lug and forming a rear abutment, a pawl resting on said arm between said front and rear abutments and having jaws constructed to engage with opposite sides of said rim, and with a slot in its outer end, and a horizontally swinging hand lever having a pin which engages with the slot of said pawl, substantially as set forth.

8. A cheese cutter comprising a frame, a cheese board pivoted on said frame, means for rotating said board having an operating lever, a back stop which arrest the backward movement of said lever, a non-foldable stop adapted to arrest the hand lever at the end of the forward movement for dividing the cheese according to weight, and a foldable stop arranged between the back stop and the non-foldable stop and adapted to arrest the hand lever at the end of its forward movement for dividing the cheese according to a predetermined selling price, substantially as set forth.

Witness my hand this 27th day of January, 1906.

ADAM A. GULDENARM.

Witnesses:
 THEO. L. POPP,
 E. M. GRAHAM.